(12) United States Patent
Lutnick et al.

(10) Patent No.: US 7,761,366 B2
(45) Date of Patent: Jul. 20, 2010

(54) SYSTEMS AND METHODS FOR PROVIDING TRADING EXCLUSIVITY/PRIORITY IN RESPONSE TO QUANTITY OF ITEMS TRADED IN ELECTRONIC TRADING SYSTEMS

(75) Inventors: Howard W. Lutnick, New York, NY (US); Joseph Noviello, Summit, NJ (US); Michael Sweeting, Aldershot (GB); Bijoy Paul, Morganville, NJ (US)

(73) Assignee: BGC Partners, Inc., New York, NY (US)

( * ) Notice: Subject to any disclaimer, the term of this patent is extended or adjusted under 35 U.S.C. 154(b) by 740 days.

(21) Appl. No.: 11/328,566

(22) Filed: Jan. 9, 2006

(65) Prior Publication Data
US 2007/0162378 A1 Jul. 12, 2007

(51) Int. Cl.
*G06Q 40/00* (2006.01)
(52) U.S. Cl. .................................... 705/37
(58) Field of Classification Search ............. 705/35, 705/37
See application file for complete search history.

(56) References Cited

U.S. PATENT DOCUMENTS

| | | | |
|---|---|---|---|
| 6,560,580 B1* | 5/2003 | Fraser et al. | 705/36 R |
| 6,985,883 B1* | 1/2006 | Togher et al. | 705/37 |
| 7,236,944 B1* | 6/2007 | Schwartz et al. | 705/14 |
| 2002/0091617 A1* | 7/2002 | Keith | 705/37 |
| 2004/0059666 A1* | 3/2004 | Waelbroeck et al. | 705/37 |
| 2004/0210511 A1* | 10/2004 | Waelbroeck et al. | 705/37 |
| 2005/0144099 A1* | 6/2005 | Deb et al. | 705/35 |
| 2006/0224491 A1* | 10/2006 | Pinkava | 705/37 |
| 2007/0022036 A1* | 1/2007 | Korzinin | 705/37 |
| 2007/0061241 A1* | 3/2007 | Jovanovic et al. | 705/37 |
| 2007/0143198 A1* | 6/2007 | Brandes et al. | 705/36 R |

\* cited by examiner

*Primary Examiner*—Charles R Kyle
*Assistant Examiner*—David L Wood
(74) *Attorney, Agent, or Firm*—Thomas D. Bradshaw

(57) ABSTRACT

Systems and methods for providing trading exclusivity/priority in response to quantity of items traded in electronic trading systems is provided. The method preferably includes receiving an incoming order for the item and determining whether the incoming order matches a current order for the item and satisfies a minimum volume requirement. When the incoming order matches a current order for the item and satisfies a minimum volume requirement, the method includes transacting a trade between the incoming order and the current order and providing a predetermined time period of exclusive trading between a participant associated with the incoming order and a participant associated with the current order.

49 Claims, 9 Drawing Sheets

SYSTEMS AND METHODS FOR PROVIDING TRADING EXCLUSIVITY/PRIORITY IN RESPONSE TO QUANTITY OF ITEMS TRADED IN ELECTRONIC TRADING SYSTEMS

INTRODUCTION

The present invention relates to electronic systems and methods for obtaining priority and/or exclusivity in electronic trading systems.

BACKGROUND OF THE INVENTION

One important component of electronic trading systems is order priority. Order priority is the mechanism by which systems determine which orders are matched first, second, etc. To facilitate orderly and market-efficient transactions, electronic trading systems may establish rules or combinations of rules to determine which buyers and which sellers can trade with each other at a given time.

Priority rules may be based on both price, time or other suitable criteria. Typically, buyers and sellers place bids and offers for a defined class of traded goods. Each trading participant may place a bid or offer at a select price and volume. Priority may be awarded to the best or highest bid price from a trading participant who wants to buy the traded good, as well as to the best or lowest offer price from a trading participant who wants to sell the traded good. If multiple competing orders are resident in the system at the same price, then priority may be awarded to the earliest in time order among the competing orders. As such, a queue (or "stack") of bids and offers develops in price and time order.

In some trading systems, once the queue forms, trading may begin only by an affirmative action on the part of a trading participant. This is sometimes knows as hit—i.e., an acceptance of a pending bid—and lift (or, "take")—i.e., an acceptance of a pending offer—trading. In hit and lift trading, the trading participant who takes affirmative action to enact a trade—i.e., he either hits a bid or lifts an offer—may be known as the "active" participant. The trading participant whose bid was hit or whose offer was lifted may be known as a "passive" participant. The first of such active and passive trading participants in line to trade may be referred to herein as "current" participants. The current participants may trade while the other participants remain queued up in the stack below waiting to trade.

During some types of hit and lift trading, initial exclusivity may be awarded to the first trading participant that actively hit a bid or lifted an offer and to the first passive participant on the contra side of the trade. These trading participants may therefore transact trades further between each other and then subsequently with more contra counterparties before other participants on their same side who did not initially act affirmatively to trade or may not have participated passively on the contra side of the trade, respectively.

In some embodiments of hit and lift trading, once a trade has been transacted, the current participants may be allowed exclusivity to trade additional volume for a predetermined time period or some other suitable time period. A hit and lift system that includes the ability for current participants to transact additional volume once an initial trade has been transacted is described in detail in U.S. Pat. No. 6,560,580, which is incorporated herein by reference in its entirety. The additional time period grants the current participants preferably a predetermined time-limited exclusivity and allows the current participants at least one period of time to trade exclusively at that price.

After the current trading participants who have initial exclusivity are finished, or, alternatively "done", trading, trading may continue down the stack in price and time order, or "priority". Price and time priority trading rewards priority to same price orders that are submitted earliest in time.

Order exclusivity may be defined for purposes of this application as the exclusive or semi-exclusive right of certain participants to trade on orders in an electronic trading system. As described above, order exclusivity is granted to certain participants. Order exclusivity may be granted to traders in certain trading states based on certain criteria. For the purposes of this application, a trading state is defined as a set of rules or conditions that govern the interaction between trading participants.

It would be desirable to provide systems and methods that further define the rules or conditions that govern the awarding of priority/exclusivity to trading participants.

SUMMARY OF THE INVENTION

It would be desirable to provide systems and methods that further define the rules or conditions that govern the awarding of priority/exclusivity to trading participants.

Systems and methods for providing trading exclusivity/priority in response to quantity of items traded in electronic trading systems is provided. The method preferably includes receiving an incoming order for the item and determining whether the incoming order matches a current order for the item and satisfies a minimum volume requirement. When the incoming order matches a current order for the item and satisfies a minimum volume requirement, the method includes transacting a trade between the incoming order and the current order and providing a predetermined time period of exclusive trading between a participant associated with the incoming order and a participant associated with the current order.

BRIEF DESCRIPTION OF THE DRAWINGS

Further features of the invention, its nature and various advantages will be apparent from the following detailed description of the preferred embodiments, taken in conjunction with the accompanying drawings, in which like reference characters refer to like parts throughout, and in which.

DETAILED DESCRIPTION OF THE INVENTION

Figure 1:
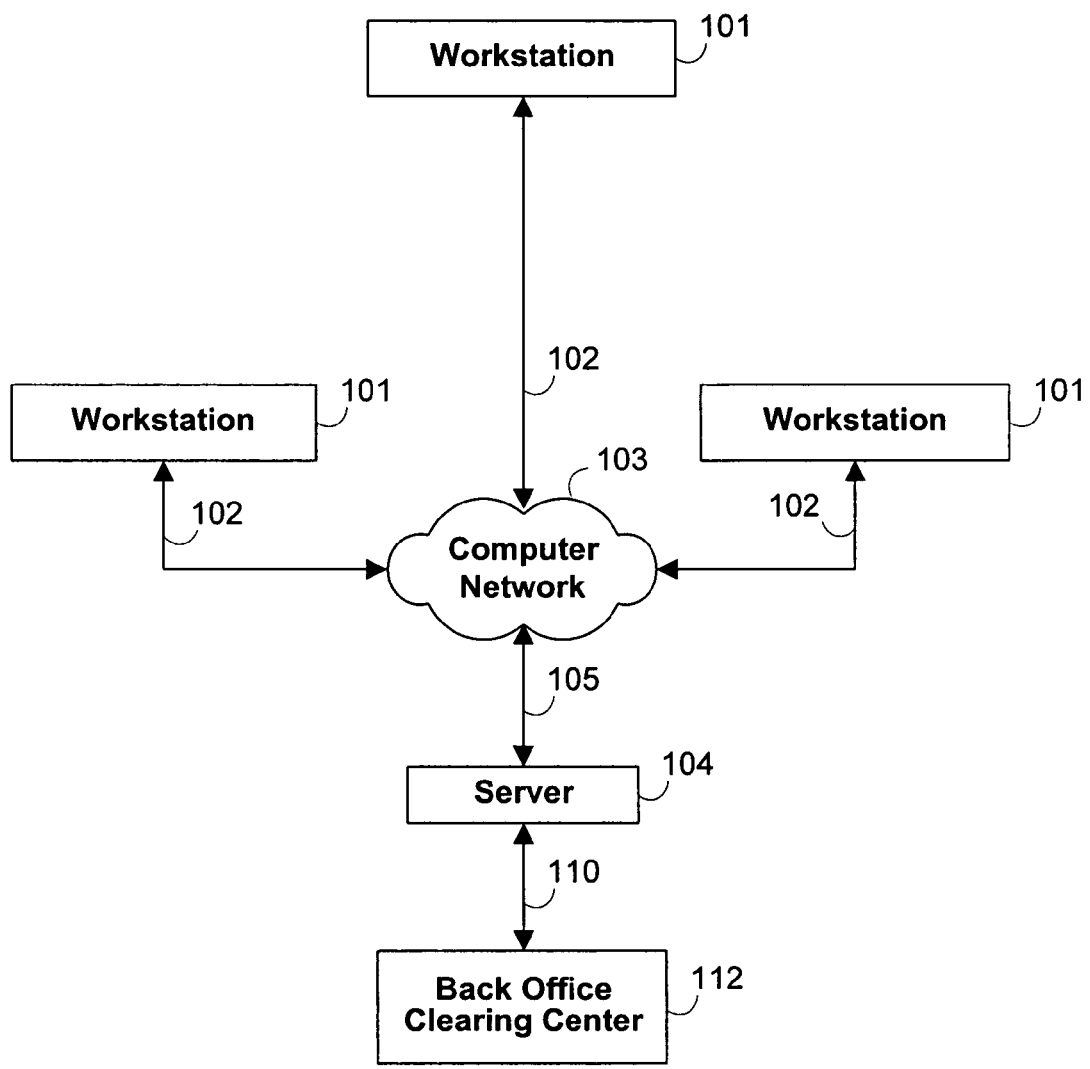
FIG. 1 is an illustration of an electronic implementation of a system in accordance with some embodiments of the present invention.

One of the main concepts relating to the systems and methods of the invention is rewarding the displayed intention to trade a certain minimum quantity of an item with the opportunity for exclusivity in trading. System and methods according to the invention preferably require a minimum displayed quantity to be eligible for certain exclusivity in trading privileges. Passive and active trade requests that meet the minimum quantity requirement may be eligible for trading exclusivity and/or last buyer/seller privileges. According to such systems and methods, all other requests are preferably not to be awarded any exclusivity to workup a trade and will not qualify for rights associated with being the last buyer/seller in a particular trade.

In any particular trading platform, the quantity for exclusivity rules (which may be alternatively understood, under certain trading conditions such as conditions that award priority to the last buyer/seller in a trade when the trading platform transitions from one trade state to another trade state, to be quantity for priority rules such as the priority rules described in co-pending patent application entitled Systems and Methods for Establishing First on the Follow Trading Priority in Electronic Trading Systems, filed on even date herewith, which is hereby incorporated by reference herein in its entirety) may be selectively enabled for particular products and/or particular time periods during the day. Furthermore, certain selectable minimum quantities may vary from product to product.

In one exemplary application, quantity for priority rules may be in effect for an electronic trading platform's US Treasuries product during the New York trading session. Thus, in one embodiment of the invention, between the hours of 7:00 am EST and 5:30 pm EST the following minimum display quantities are required to be eligible to qualify for priority:

2-year U.S. Treasury Notes—A display of 25 Million is required for entitlement to priority privileges.
3-year or 5-year U.S. Treasury Notes—A display of 10 Million is required for entitlement to priority privileges.
10-year U.S. Treasury Bonds—A display of 10 Million is required for entitlement to priority privileges.
30-year U.S. Treasury Bonds—A display of 3 Million is required for entitlement to priority privileges.
During all other sessions, all trades may be eligible for priority.

One embodiment of quantity for priority trading rules operate as follows: To be awarded priority the trader who initiates a trade should preferably lift/hit the total quantity on the screen and request at least the minimum quantity level required for that particular security. If the trader initiates a trade for less than the greater of the quantity shown on the screen or the minimum quantity in the corresponding US Treasury Benchmarks he will not be awarded any exclusivity. These two requirements preferably form one set of rules according to the invention.

It follows from this that resting markets (bid/offers resident in the system) should preferably be displayed for at least the minimum quantity required in the corresponding US Treasury Benchmark to be eligible for exclusivity.

As stated above, in one embodiment of the invention, traders can continue to type as they do today. However, if they prefer, traders can change their Bid/Buy and Offer/Sell default size (the term "size" used herein to refer to volume of the item being traded) trade settings in instrument settings to match the minimum size requirement in the corresponding US Treasury Benchmark to insure that they will receive priority where possible.

In one embodiment of the invention, a method includes receiving an incoming order for the item and determining whether the incoming order matches a current order for the item and satisfies a minimum volume requirement. When the incoming order matches a current order for the item and satisfies a minimum volume requirement, the method preferably transacts a trade between the incoming order and the current order and provides a predetermined time period of exclusive trading between a participant associated with the incoming order and a participant associated with the current order. This exclusive time period preferably follows the transacting of the volume of the item shown in the current order.

In one alternative embodiment of the invention, the minimum volume requirement that qualifies a participant for exclusive trading may be dynamic. For example, the minimum volume requirement may be set to be a function of time of day, volatility of trading, or some other suitable variable. Thus the minimum volume requirement for obtaining exclusivity may change in response to different stimuli.

In an alternate aspect of the invention, the passive order (or, in some embodiments, the active order if it is displayed on the screen prior to the matching with the passive order) should display an amount that satisfies a minimum threshold in order for a trade that matches the passive order to obtain exclusive trading privileges.

In some embodiments of the invention, a trading participant (which may be any broker, dealer, customer or application programming interface that uses the system for trading) may want to set his default trading settings in order to insure that he obtains exclusivity for his trades unless he specifies otherwise. For such a participant, he may set the minimum threshold trading requirement for obtaining exclusivity as his default minimum trading amount.

In another alternative embodiment of the invention, an individual who is associated with a group of other participants, such as a trading desk or other trading location, may be allowed to obtain exclusive rights of trading based on the aggregated daily volume of the group of participants—e.g., when the aggregated daily volume surpasses a threshold amount—instead of the volume of a single trade. It should be noted that in this embodiment, as well as in other certain described embodiments of this application, one or both of the trade participants may be entitled to exclusivity. Where the case occurs that one of the trade participants is entitled to exclusivity, then the other participant may be replaced by a third participant in a manner such that the rules allow to participate exclusively. Thus, only one of the two trade participants may be entitled to the exclusivity.

In yet another embodiment of the invention, an individual's daily trading activity—e.g., daily trading volume—may be used to determined whether the individual is entitled to rights of trading exclusively. Similarly, the right to trade exclusively may depend on a participant's most recent trading history—i.e., the rights to trade exclusively may depend on the history of a trade in which the participant is presently involved.

The following is an exemplary trade according to the invention with respect to the immediately preceding implementation:

| Bid | | Offer | |
|---|---|---|---|
| T1 | 22 | T3 | 5 |
| T2 | 5 | T4 | 15 |

Assuming a minimum threshold requirement of 25, when T5 (a new participant) hits T1's bid for 22, no priority would be awarded. However, in the immediately-preceding embodiment of the invention, if T1 was to add an additional 3 million to the bid side of the market within a certain predetermined time, and then the 3 million was hit by T3 (or, in some embodiments, a different seller) T1 may be entitled to exclusivity because he has satisfied the minimum threshold requirement for the market, albeit over two trades. This may be required to occur within a certain predetermined time window. It should be noted that for this embodiment to be implemented effectively, participant T1 may be afforded an extra opportunity to remain at the top of the trading stack in order to be allowed to complete the requisite minimum trade requirement. Alternatively, T1 may be required to reenter at the end of the trading stack as per conventional price/time priority trading.

With respect to yet another embodiment of the invention, hidden size—i.e., a portion of the order that is not shown to the rest of the participants, but, if acted upon, is tradable—may also count toward satisfying the minimum volume requirement of the order to qualify for exclusive trading privileges.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation, or the Graphical User Interface may reside on Workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, programmed computers having memory, the programmed computer using the memory for implementing trading models, etc., or any combination of the same. Workstations 102 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
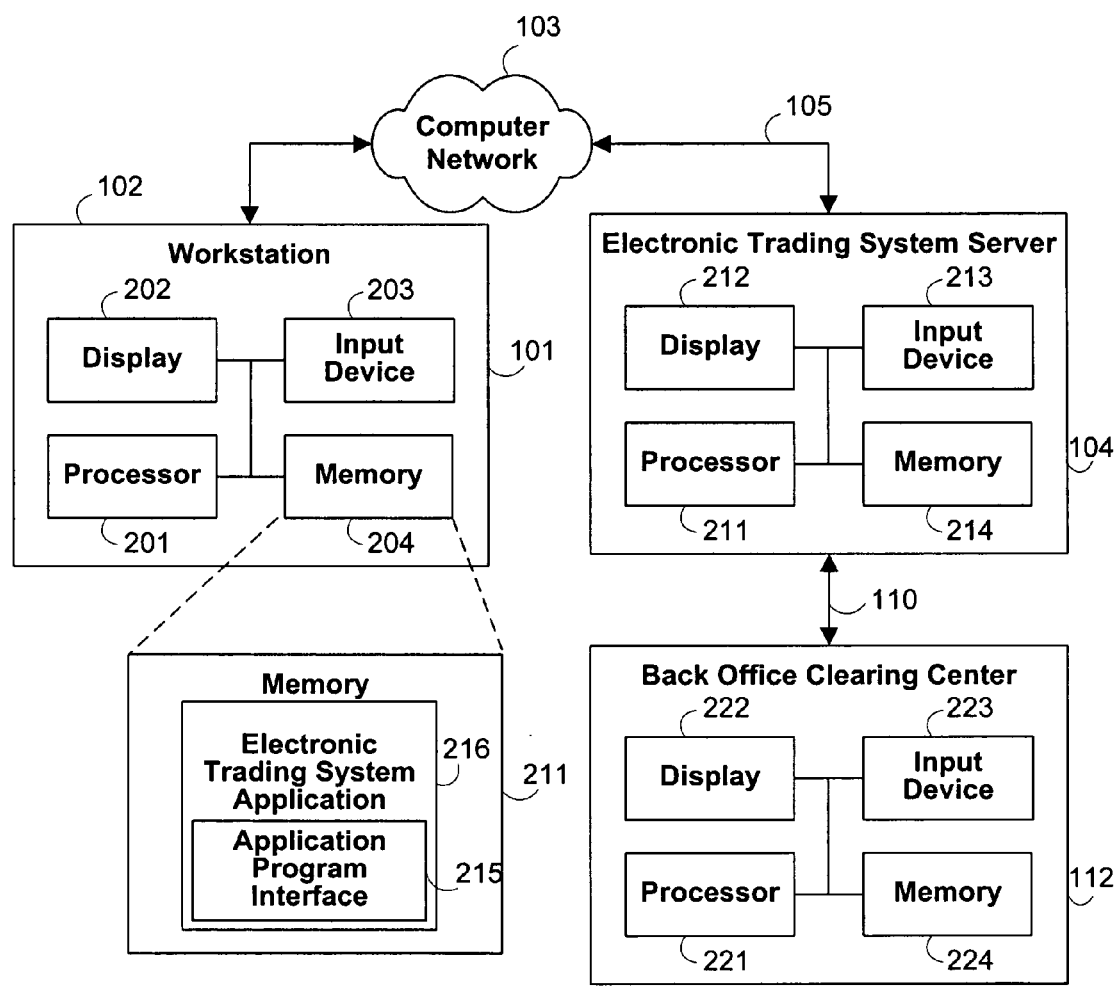
FIG. 2 is an illustration, in greater detail, of an electronic implementation of a system in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. The storage device may include software stored on a suitable storage medium such as a disk. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

Figure 3:
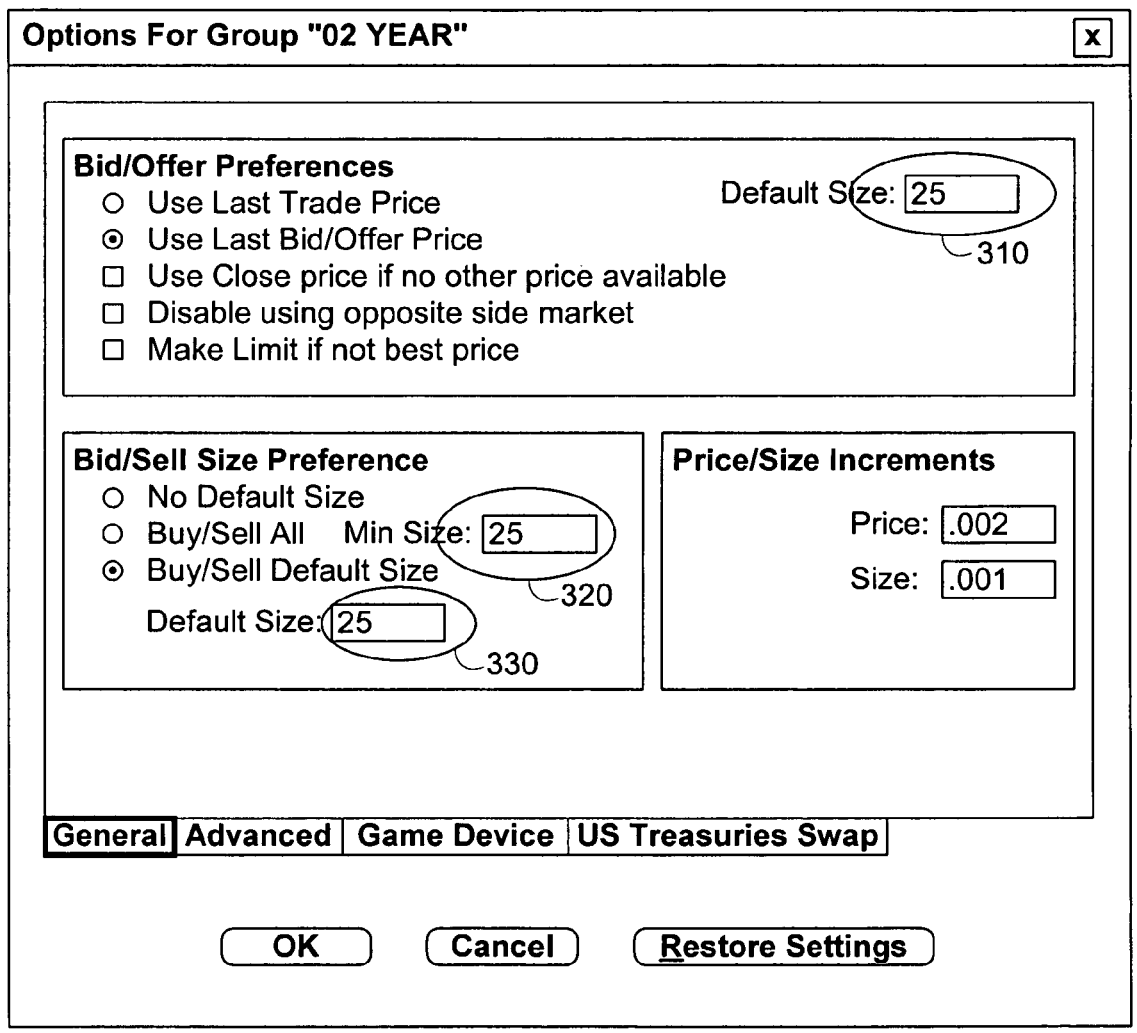
FIG. 3 is a graphic user interface for use in a method and system according to the invention.

FIG. 3 shows a graphical user interface 300 that includes settings according to the invention. These settings for the bid/offer default size 310, the buy all/sell all minimum size 320, and the buy all/sell all default size 330, may be adjusted so as to correspond to the minimum setting required to entitled the participant to exclusive privileges associated with a matched trade.

Figure 4:
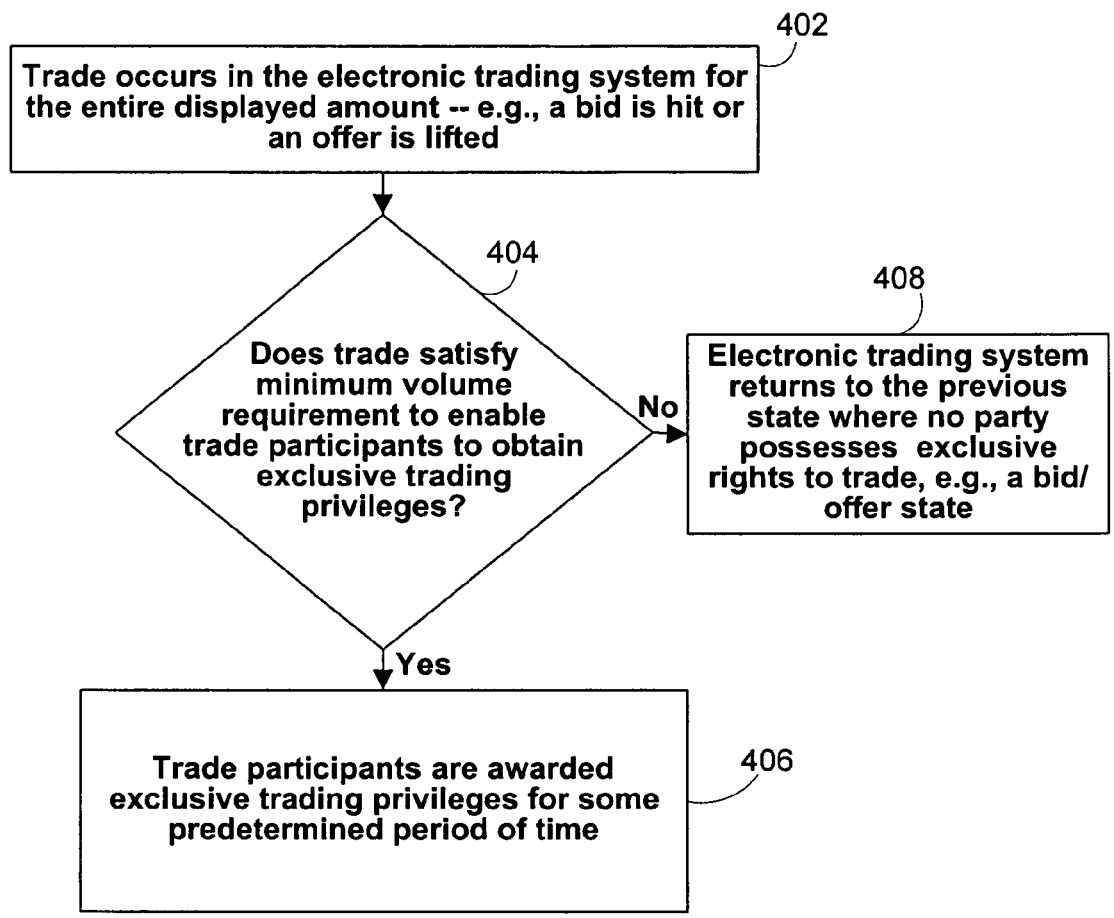
FIGS. 4-9 are a series of flow diagrams describing methods according to the invention.

FIG. 4 shows a flow chart according to the invention that includes a trade occurrence in an electronic trading system for the entire displayed amount—e.g., a bid is hit or an offer is lifted—at step 402. Then, the system queries whether the trade satisfies a minimum volume requirement to enable the trade participants to obtain exclusive trading privileges at step 404. When the system determines that the minimum volume requirement has been satisfied, trade participants are awarded exclusive trading privileges for some predetermined period of time, as shown in step 406. When the system determines that the minimum volume requirement has not been satisfied, the electronic trading system returns to the previous state where no party possesses exclusive rights to trade, e.g., a bid/offer state as described in the '580 patent as shown in step 408.

Figure 5:
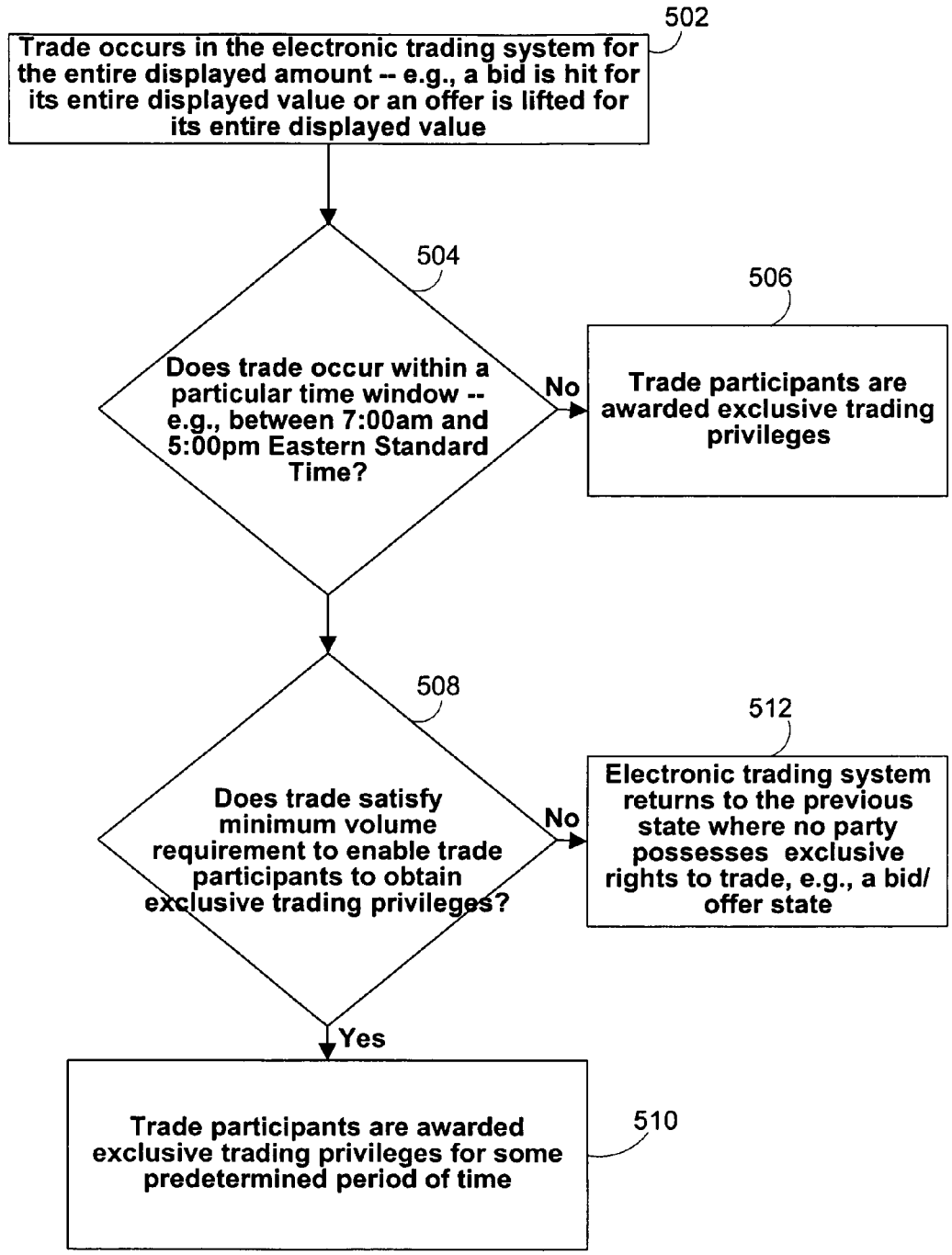

FIG. 5 shows a flow chart according to the invention that includes a two-stage query. A trade occurrence for the entire displayed amount—e.g., a bid is hit or an offer is lifted—is shown at step 502. Then, the system preferably queries whether the trade occurred within a particular time window—e.g., between 7:00 am and 5:00 pm Eastern Standard Time, as shown at step 504. When the system determines that the trade did not occur in the predetermined time window, the electronic trading system awards the trade participants exclusive trading privileges 506.

When the system determines that the trade occurred in the predetermined time window, the system queries whether the trade satisfies minimum volume requirements in order to enable trade participants to obtain exclusive trading privileges 508. When the system determines that the minimum volume requirement has been satisfied, trade participants are awarded exclusive trading privileges for some predetermined period of time, as shown in step 510. When the system determines that the minimum volume requirement has not been satisified, the electronic trading system returns to the previous state where no party possesses exclusive rights to trade, e.g., a bid/offer state as described in the '580 patent as shown in step 512.

Figure 6:
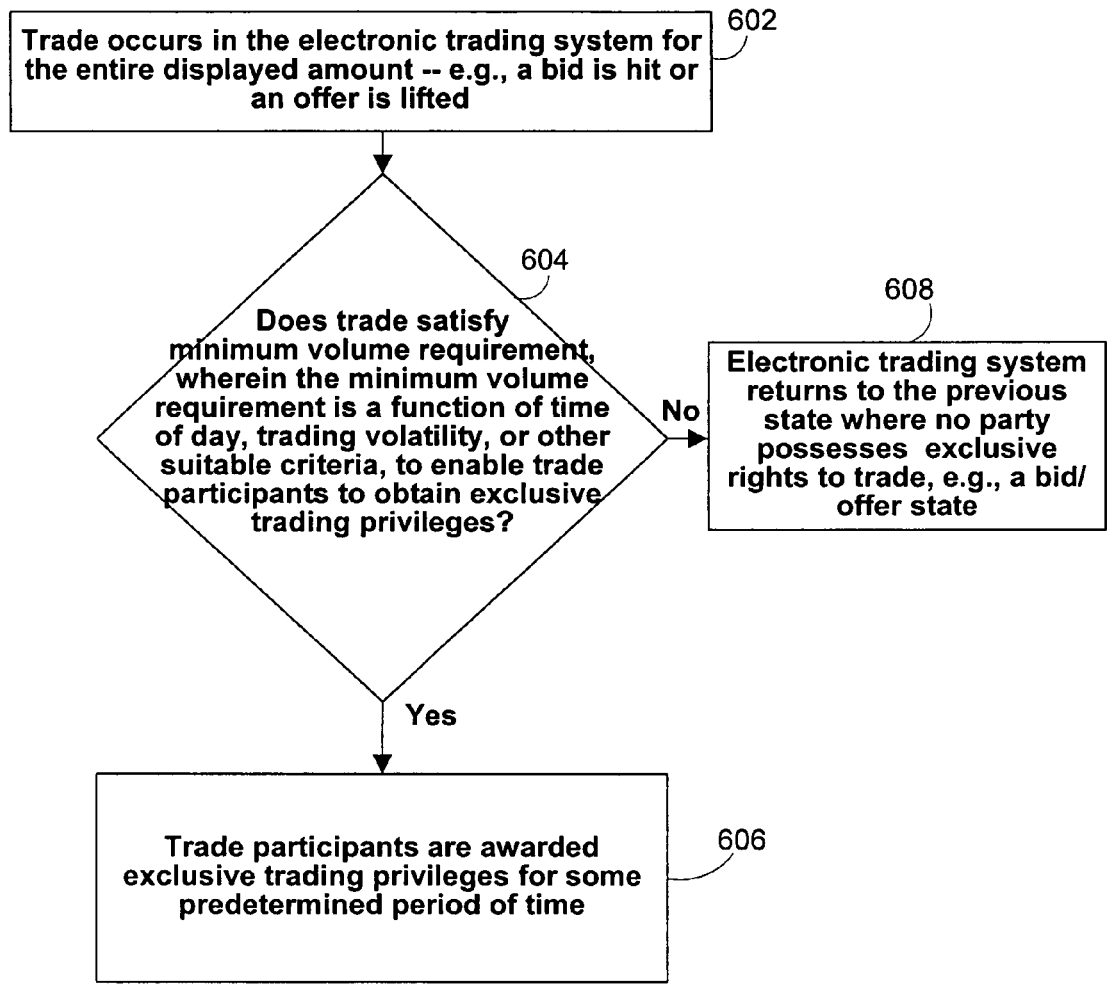

FIG. 6 shows a flow chart according to the invention that determines whether the trade satisfies minimum volume requirement, wherein the minimum volume requirement is a function of time of day, trading volatility, or other suitable criteria, to enable trade participants to obtain exclusive trading privileges as shown in step 604. In all other aspects, the method shown in FIG. 6 is substantially similar to the method shown in FIG. 4.

Figure 7:
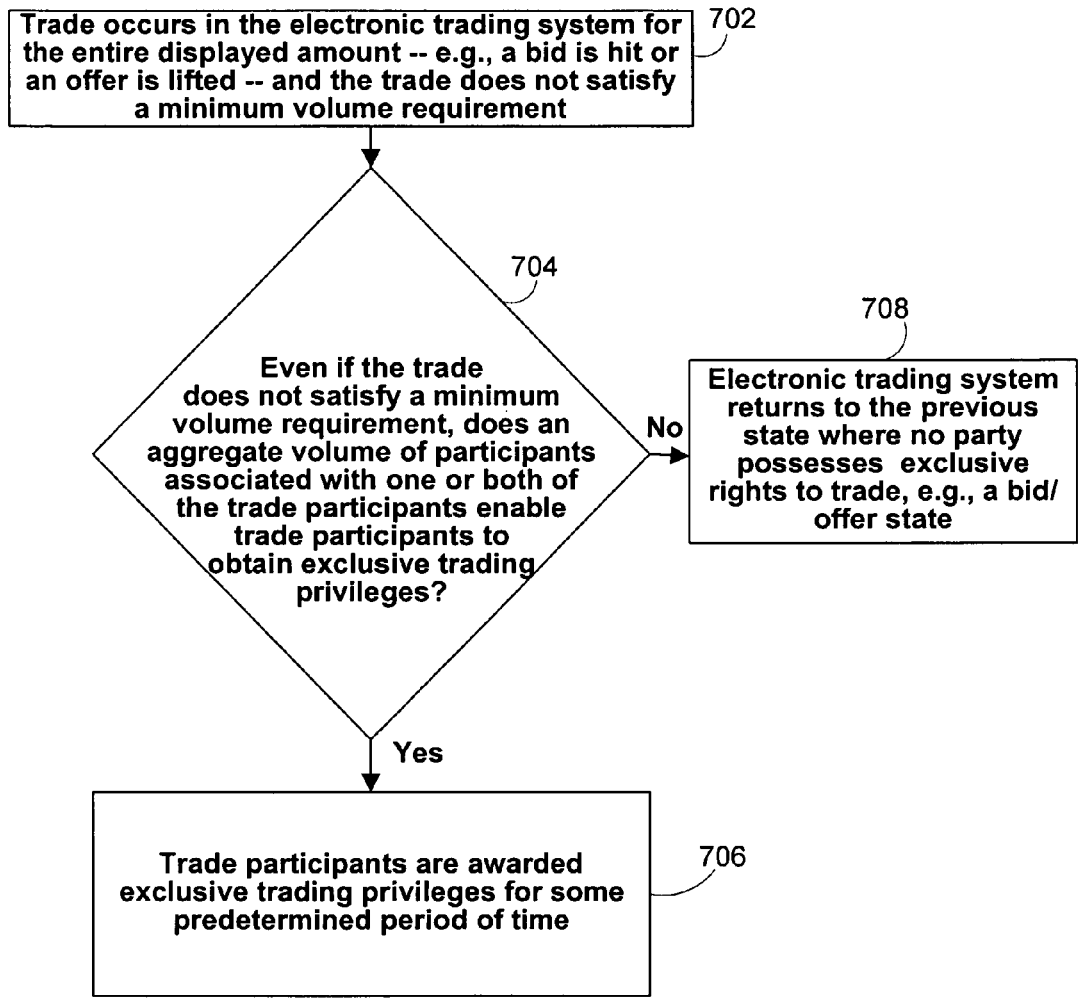

FIG. 7 shows a flow chart according to the invention that shows a trade occurrence in the electronic trading system for the entire displayed amount—e.g., a bid is hit or an offer is lifted—but the volume of the trade does not satisfy a minimum volume requirement 702. Thereafter, the system queries whether an aggregate volume of trading performed by participants associated with one or both of the trade participants, such as fellow members of a trading desk, enables trade participants to obtain exclusive trading privileges, even though the trade itself is not of sufficient volume to entitle the trading participants to exclusive trading privileges 704. If the aggregate volume is sufficient, trade participants are awarded exclusive trading privileges for some predetermined period of time, as shown in step 706. When the system determines that the aggregate volume is insufficient, the electronic trading system returns to the previous state where no party possesses exclusive rights to trade, e.g., a bid/offer state as described in the '580 patent as shown in step 708.

Figure 8:
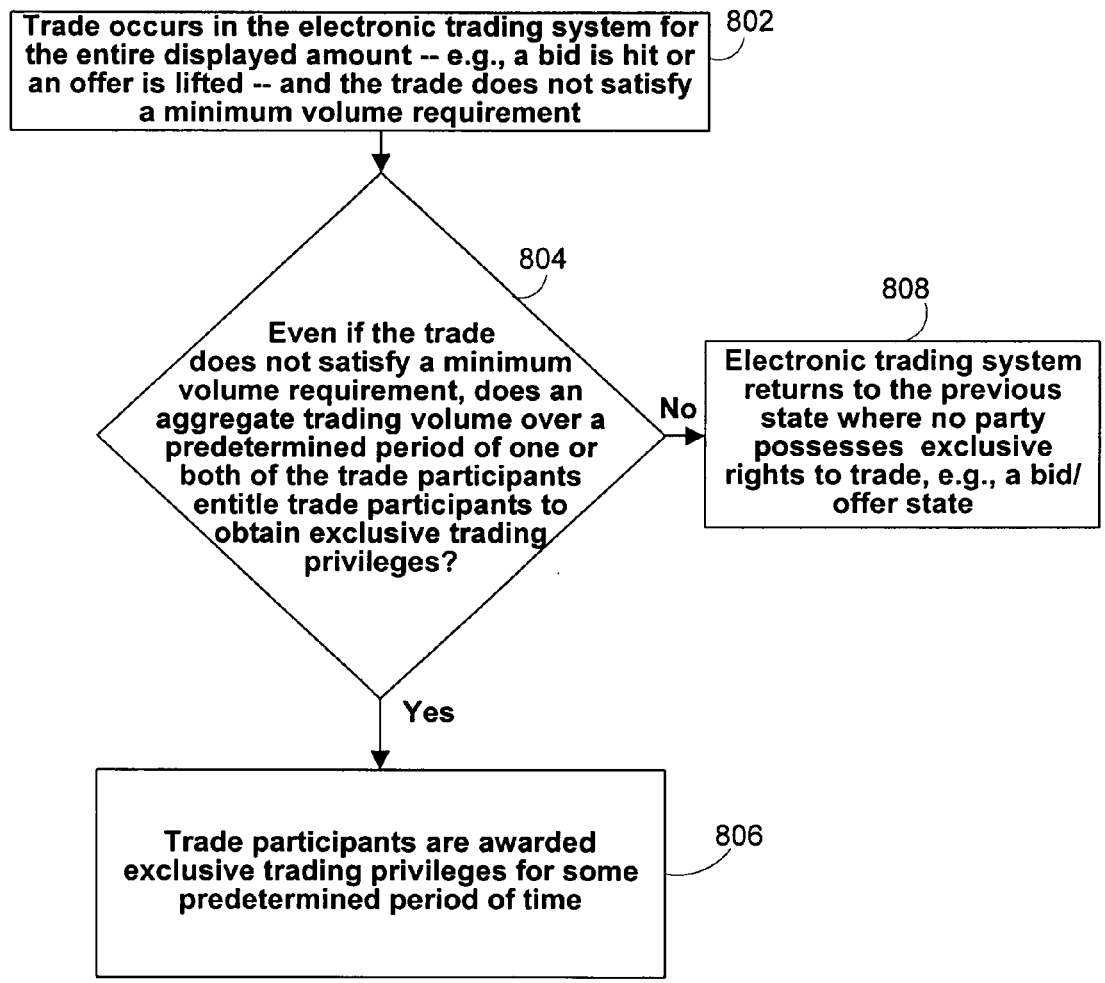

FIG. 8 shows a flow chart according to the invention that shows a trade occurrence in the electronic trading system for the entire displayed amount—e.g., a bid is hit or an offer is lifted—but the volume of the trade does not satisfy a minimum volume requirement 802. Thereafter, the system queries whether an aggregate volume of one or both of the trade participants individually enables the trade participants to obtain exclusive trading privileges, even though the trade itself is not of sufficient volume to entitle the trading participants to exclusive trading privileges 804. If the aggregate volume is sufficient, trade participants are awarded exclusive trading privileges for some predetermined period of time, as shown in step 806. When the system determines that the aggregate volume is insufficient, the electronic trading system returns to the previous state where no party possesses exclusive rights to trade, e.g., a bid/offer state as described in the '580 patent as shown in step 808.

Figure 9:
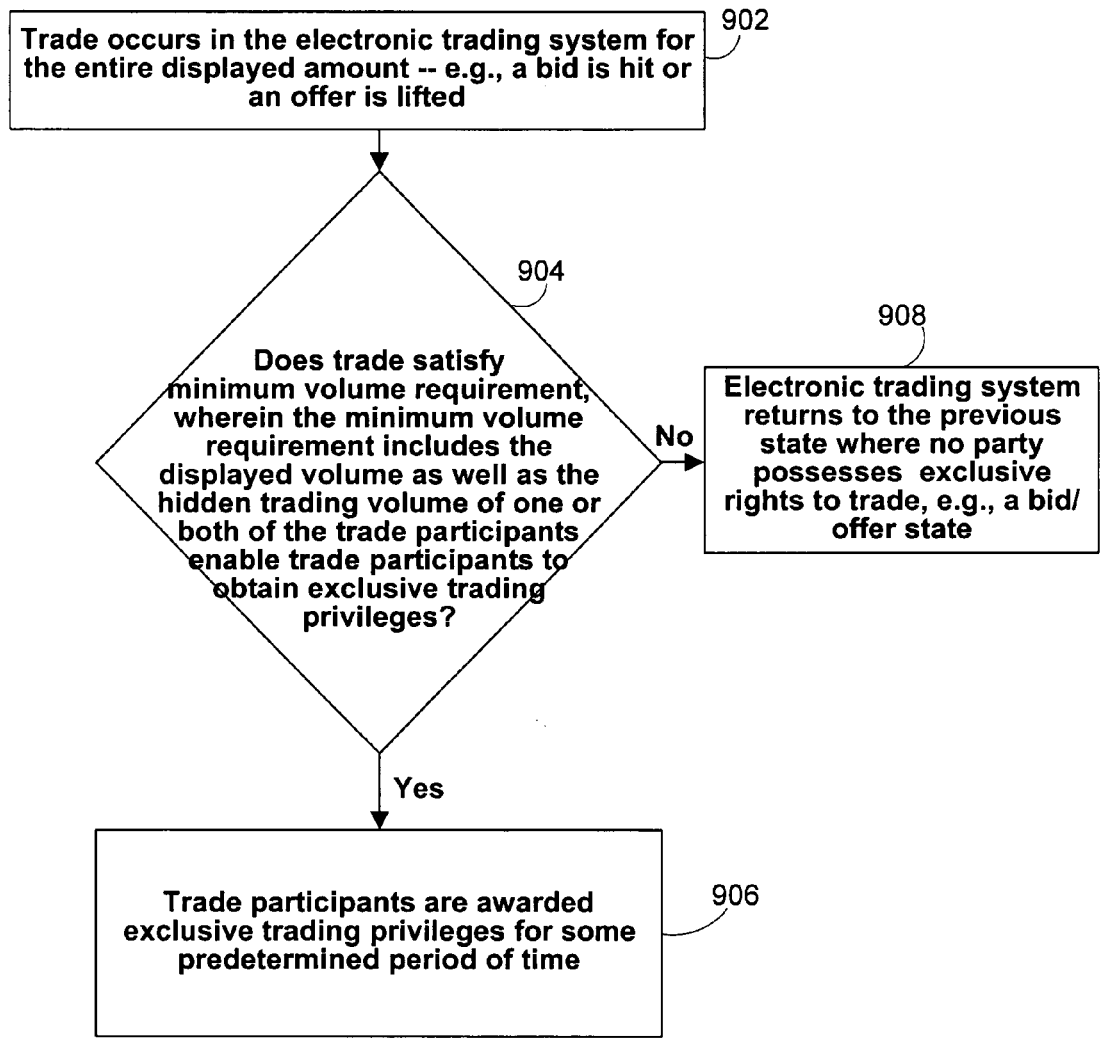

FIG. 9 shows a flow chart according to the invention in which a trade occurs in the electronic trading system for the entire displayed amount—e.g., a bid is hit or an offer is lifted. Thereafter the system queries whether, though the displayed amount of the trade does not entitle the trade participants to exclusive trading privileges, is there a hidden volume associated with one or both of the trading participants that entitles the trading participants to exclusive trading privileges 904. When the system determines that one or both of the trading participants includes sufficient hidden volume, the trade participants are entitled to exclusive trading privileges 906. When the system determines that one or both of the trading participants do not include sufficient hidden volume in their respective trade orders, the electronic trading system returns to the previous state where no party possesses exclusive rights to trade—e.g., a bid/offer state 908.

Thus, systems and method for defining criteria for limiting exclusive priority in electronic trading systems to circumstances in which a predetermined minimum quantity is displayed or acted upon have been provided. It will be understood that the foregoing is only illustrative of the principles of the invention, and that various modifications can be made by those skilled in the art without departing from the scope and spirit of the invention.

The invention claimed is:

1. A method for trading an item in an electronic trading system, the method comprising:
   receiving at a computing device an incoming order for the item from at least one server coupled to the computing device over a network;
   determining by a computing device coupled to the at least one server that the incoming order is contra to a current order for the item, includes a volume equal to or greater than a volume of the current order, and satisfies a predetermined minimum volume requirement that varies over time during a trading day such that the minimum volume requirement at a first time during the trading day is different from the minimum volume requirement at a second time during the trading day; and
   based on the act of determining that the incoming order is contra to a current order, includes a volume equal to or greater than a volume of the current order, and satisfies the predetermined minimum volume requirement, transacting a trade between the incoming order and the current order in the electronic trading system.

2. The method of claim 1, in which the act of determining comprises determining that at least one of 1) the incoming order, 2) the current order, and 3) the transacting a trade occurred in a predetermined window of time.

3. The method of claim 1 further comprising adjusting the minimum volume requirement based on time of day.

4. The method of claim 1 further comprising adjusting the minimum volume requirement based on trading volatility.

5. The method of claim 1, wherein the act of determining that the incoming order satisfies the minimum volume requirement comprises using an aggregate trading volume of a group of participants associated with at least one of the participant associated with the incoming order and the participant associated with the current order to determine that the minimum volume requirement has been satisfied.

6. The method of claim 5, wherein the act of using an aggregate trading volume of a group of participants to determine that the minimum volume requirement has been satisfied comprises determining that an aggregated daily volume of the group of participants has surpassed a threshold amount.

7. The method of claim 1, wherein the act of determining that the incoming order satisfies the minimum volume requirement comprises using an aggregate trading volume associated with at least one of the participant associated with the incoming order and the participant associated with the current order to determine that the minimum volume requirement has been satisfied.

8. The method of claim 1, further comprising:
   determining by a computing device that the trade occurred outside of a window of time; and
   based on the act of determining that the trade occurred outside of the window of time, reducing or withdrawing the minimum volume requirement.

9. The method of claim 1, further comprising:
   based on the act of determining that the incoming order is contra to a current order, includes a volume equal to or greater than a volume of the current order, and satisfies the predetermined minimum volume requirement, providing in the electronic trading system a predetermined time period of exclusive trading between a participant associated with the incoming order and a participant associated with the current order.

10. The method of claim 1, in which the act of determining comprises determining that one of 1) the incoming order, 2) the current order, 3) the transacting a trade and 4) some combination of the incoming order, the current order and the transacting a trade occurred in a predetermined window of time.

11. The method of claim 1, in which the act of determining comprises:
   determining that at least one of 1) the incoming order, 2) the current order, and 3) the transacting a trade occurred in a predetermined window of time, and
   based on the act of determining that at least one of 1) the incoming order, 2) the current order, and 3) the transacting a trade occurred in a predetermined window of time, reducing the minimum volume requirement.

12. The method of claim 1, in which the act of determining comprises:
   determining that at least one of 1) the incoming order, 2) the current order, and 3) the transacting a trade occurred in a predetermined window of time, and
   based on the act of determining that at least one of 1) the incoming order, 2) the current order, and 3) the transacting a trade occurred in a predetermined window of time, withdrawing the minimum volume requirement.

13. A method for trading an item in an electronic trading system comprising a plurality of computing devices and at least one server, the method comprising:
   receiving at a computing device an incoming order for the item from the at least one server coupled to the computing device over a network;
   determining by a computing device coupled to the at least one server that the incoming order matches a current order for the item and satisfies a predetermined minimum volume requirement that varies over time during a trading day such that the minimum volume requirement at a first time during the trading day is different from the minimum volume requirement at a second time during the trading day;
   based on the act of determining that the incoming order matches a current order for the item and satisfies the predetermined minimum volume requirement, transacting a trade in the electronic trading system between the incoming order and the current order.

14. The method of claim 13, in which the act of determining further comprises:
   determining whether at least one of 1) the incoming order, 2) the current order, and 3) the transacting a trade occurred in a predetermined window of time and
   when the system determines that the trade occurred outside of the window of time, reducing or withdrawing the minimum volume requirement.

15. The method of claim 13 further comprising adjusting the minimum volume requirement based on time of day.

16. The method of claim 13 further comprising adjusting the minimum volume requirement based on trading volatility.

17. The method of claim 13 further comprising determining that the minimum volume requirement has been satisfied based on an aggregate trading volume of a group of participants associated with at least one of the participant associated with the incoming order and the participant associated with the current order trade participants to determine whether the minimum volume requirement has been satisfied.

18. The method of claim 13 further comprising determining that the minimum volume requirement has been satisfied based on an aggregate trading volume associated with at least one of the participant associated with the incoming order and the participant associated with the current order to determine that the minimum volume requirement has been satisfied.

19. The method of claim 13, the determining further comprising:
   determining that at least one of 1) the incoming order, 2) the current order, and 3) the transacting a trade occurred in a predetermined window of time and,
   based on the act of determining that at least one of 1) the incoming order, 2) the current order, and 3) the transacting a trade occurred in a predetermined window of time, withdrawing the minimum volume requirement.

20. The method of claim 13, further comprising:
   based on the act of determining that the incoming order is contra to a current order, includes a volume equal to or greater than a volume of the current order, and satisfies the predetermined minimum volume requirement, providing in the electronic trading system a predetermined time period of exclusive trading between a participant associated with the incoming order and a participant associated with the current order.

21. The method of claim 13, in which the act of determining that the incoming order matches a current order and satisfies the predetermined minimum volume requirement further comprises:
   determining that the incoming order occurred in a predetermined window of time, and
   based on the act of determining that the incoming order occurred in a predetermined window of time, reducing the minimum volume requirement.

22. The method of claim 13, in which the act of determining that the incoming order matches a current order and satisfies the predetermined minimum volume requirement further comprises:
   determining that the current order occurred in a predetermined window of time, and
   based on the act of determining that the current order occurred in a predetermined window of time, reducing the minimum volume requirement.

23. The method of claim 13, in which the act of determining that the incoming order matches a current order and satisfies the predetermined minimum volume requirement further comprises:
   determining that the transacting a trade occurred in a predetermined window of time, and
   based on the act of determining that the transacting a trade occurred in a predetermined window of time, reducing the minimum volume requirement.

24. The method of claim 13, in which the act of determining that the incoming order matches a current order and satisfies the predetermined minimum volume requirement further comprises:
   determining that the incoming order, the current order, and the transacting a trade occurred in a predetermined window of time, and
   based on the act of determining that the incoming order, the current order, and the transacting a trade occurred in a predetermined window of time, reducing the minimum volume requirement.

25. The method of claim 13, in which the act of determining that the incoming order matches a current order and satisfies the predetermined minimum volume requirement further comprises:
   determining that the incoming order occurred in a predetermined window of time, and
   based on the act of determining that the incoming order occurred in a predetermined window of time, withdrawing the minimum volume requirement.

26. The method of claim 13, in which the act of determining that the incoming order matches a current order and satisfies the predetermined minimum volume requirement further comprises:
  determining that the current order occurred in a predetermined window of time, and
  based on the act of determining that the current order occurred in a predetermined window of time, withdrawing the minimum volume requirement.

27. The method of claim 13, in which the act of determining that the incoming order matches a current order and satisfies the predetermined minimum volume requirement further comprises:
  determining that the transacting a trade occurred in a predetermined window of time, and
  based on the act of determining that the transacting a trade occurred in a predetermined window of time, withdrawing the minimum volume requirement.

28. The method of claim 13, in which the act of determining that the incoming order matches a current order and satisfies the predetermined minimum volume requirement further comprises:
  determining that the incoming order, the current order, and the transacting a trade occurred in a predetermined window of time, and
  based on the act of determining that the incoming order, the current order, and the transacting a trade occurred in a predetermined window of time, withdrawing the minimum volume requirement.

29. The method of claim 13, in which the act of determining that the incoming order matches a current order and satisfies the predetermined minimum volume requirement further comprises:
  determining whether at least one of 1) the incoming order, 2) the current order, and 3) the transacting a trade occurred in a predetermined window of time, and
  based on determining whether at least one of 1) the incoming order, 2) the current order, and 3) the transacting a trade occurred in a predetermined window of time, reducing the minimum volume requirement.

30. A computer system comprising:
  a processor coupled to at least one server;
  a memory coupled to the processor, in which the memory stores instructions which, when executed by the processor, direct the processor to:
    receive an incoming order for the item from a computing device coupled to the at least one server;
    determine that the incoming order is contra to a current order for the item, includes a volume equal to or greater than a volume of the current order, and satisfies a predetermined minimum volume requirement that varies over time during a trading day such that the minimum volume requirement at a first time during the trading day is different from the minimum volume requirement at a second time during the trading day;
    based on the act of determining that the incoming order is contra to a current order, includes a volume equal to or greater than a volume of the current order, and satisfies the predetermined minimum volume requirement, transact a trade in an electronic trading system between the incoming order and the current order.

31. The system of claim 30, in which the memory stores instructions which, when executed by the processor, further direct the processor to
  determine that at least one of 1) the incoming order, 2) the current order, and 3) the transacting a trade occurred in a predetermined window of time and,
  based on the act of determining that at least one of 1) the incoming order, 2) the current order, and 3) the transacting a trade occurred in a predetermined the window of time, reduce or withdraw the minimum volume requirement.

32. The system of claim 30, in which the memory stores instructions which, when executed by the processor, further direct the processor to adjust the minimum volume requirement based on time of day.

33. The system of claim 30, in which the memory stores instructions which, when executed by the processor, further direct the processor to adjust the minimum volume requirement based on trading volatility.

34. The system of claim 30, in which the memory stores instructions which, when executed by the processor, further direct the processor to determine that the minimum volume requirement has been satisfied based on an aggregate trading volume of a group of participants associated with at least one of the participant associated with the incoming order and the participant associated with the current order to determine that the minimum volume requirement has been satisfied.

35. The system of claim 30, in which the memory stores instructions which, when executed by the processor, further direct the processor to determine that the minimum volume requirement has been satisfied based on an aggregate trading volume associated with at least one of the participant associated with the incoming order and the participant associated with the current order.

36. The system of claim 30, in which the memory stores instructions which, when executed by the processor, further direct the processor to:
  based on the act of determining that the incoming order is contra to a current order, includes a volume equal to or greater than a volume of the current order, and satisfies the predetermined minimum volume requirement, providing a predetermined time period of exclusive trading between a participant associated with the incoming order and a participant associated with the current order.

37. A computer system comprising:
  a processor coupled to at least one server;
  a memory coupled to the processor, in which the memory stores instructions which, when executed by the processor, direct the processor to:
    receive an incoming order for the item from the at least one server;
    determine that the incoming order matches a current order for the item and satisfies a predetermined minimum volume requirement that varies over time during a trading day such that the minimum volume requirement at a first time during the trading day is different from the minimum volume requirement at a second time during the trading day;
    based on the act of determining that the incoming order matches a current order for the item and satisfies the predetermined minimum volume requirement, transact a trade in an electronic trading system between the incoming order and the current order.

38. The system of claim 37, in which the memory stores instructions which, when executed by the processor, further direct the processor to:
  determine that at least one of 1) the incoming order, 2) the current order, and 3) the transacting a trade occurred in a predetermined window of time and,
  based on the act of determining that at least one of 1) the incoming order, 2) the current order, and 3) the transacting a trade occurred in a predetermined window of time, reduce or withdraw the minimum volume requirement.

39. The system of claim 37, in which the memory stores instructions which, when executed by the processor, further direct the processor to adjust the minimum volume requirement based on time of day.

40. The system of claim 37, in which the memory stores instructions which, when executed by the processor, further direct the processor to adjust the minimum volume requirement based on trading volatility.

41. The system of claim 37, in which the memory stores instructions which, when executed by the processor, further direct the processor to determine that the minimum volume requirement has been satisfied based on an aggregate trading volume of a group of participants associated with at least one of the participant associated with the incoming order and the participant associated with the current order to determine that the minimum volume requirement has been satisfied.

42. The system of claim 37, in which the memory stores instructions which, when executed by the processor, further direct the processor to determine that the minimum volume requirement has been satisfied based on an aggregate trading volume associated with at least one of the participant associated with the incoming order and the participant associated with the current order to determine that the minimum volume requirement has been satisfied.

43. The system of claim 37, in which the memory stores instructions which, when executed by the processor, further direct the processor to:
based on the act of determining that the incoming order matches a current order for the item and satisfies the predetermined minimum volume requirement, provide a predetermined time period of exclusive trading between a participant associated with the incoming order and a participant associated with the current order.

44. A computer readable medium having instructions stored therein which, when executed by a computing device, causes the computing device to:
receive an incoming order for the item from a computer processor in an electronic trading system;
determine that the incoming order is contra to a current order for the item, includes a volume equal to or greater than a volume of the current order, and satisfies a minimum volume requirement that varies over time during a trading day such that the minimum volume requirement at a first time during the trading day is different from the minimum volume requirement at a second time during the trading day; and
based on the act of determining that the incoming order is contra to a current order, includes a volume equal to or greater than a volume of the current order, and satisfies the minimum volume requirement, transact a trade in the electronic trading system between the incoming order and the current order.

45. The computer readable medium of claim 44, in which the instructions, when executed by a computing device, further causes the computing device to:
based on the act of determining that the incoming order is contra to a current order, includes a volume equal to or greater than a volume of the current order, and satisfies the minimum volume requirement, provide a predetermined time period of exclusive trading between a participant associated with the incoming order and a participant associated with the current order.

46. A computer readable medium having software embodied therein which, when executed by a computing device, causes the computing device to:
receive an incoming order for the item from a computer processor in an electronic trading system;
determine that the incoming order matches the current order for the item and satisfies a minimum volume requirement that varies over time during a trading day such that the minimum volume requirement at a first time during the trading day is different from the minimum volume requirement at a second time during the trading day;
based on the act of determining that the incoming order matches a current order for the item and satisfies the minimum volume requirement, transact a trade in an electronic trading system between the incoming order and the current order.

47. The computer readable medium of claim 46, in which the instructions, when executed by a computing device, further causes the computing device to:
based on the act of determining that the incoming order matches a current order for the item and satisfies the minimum volume requirement, provide a predetermined time period of exclusive trading between a participant associated with the incoming order and a participant associated with the current order.

48. A method for trading an item in an electronic trading system, the method comprising:
during a trading day, receiving at a computing device a first incoming order for the item from at least one server coupled to the computing device over a network;
determining by a computing device coupled to the at least one server that the first incoming order is contra to a first current order for the item, includes a volume equal to or greater than a volume of the first current order, and satisfies a predetermined minimum volume requirement that varies over time during a trading day such that the minimum volume requirement at a first time during the trading day is different from the minimum volume requirement at a second time during the trading day;
based on the act of determining that the first incoming order is contra to the first current order, includes a volume equal to or greater than a volume of the first current order, and satisfies the predetermined minimum volume requirement, transacting a trade between the first incoming order and the first current order in the electronic trading system;
during the trading day, adjusting by a computing device coupled to the at least one server the predetermined minimum volume requirement;
during the trading day, receiving by a computing device coupled to the at least one server a second incoming order for the item from the at least one server;
determining by a computing device coupled to the at least one server that the second incoming order is contra to a second current order for the item, includes a volume equal to or greater than a volume of the second current order, and satisfies the adjusted predetermined minimum volume requirement; and
based on the act of determining that the second incoming order is contra to the second current order for the item, includes a volume equal to or greater than the volume of the second current order, and satisfies the adjusted predetermined minimum volume requirement, transacting a trade during the trading day between the incoming order and the current order in the electronic trading system.

49. The method of claim 48, further comprising:
based on the act of determining that the first incoming order is contra to the first current order, includes a volume equal to or greater than a volume of the first current order, and satisfies the predetermined minimum volume requirement, providing a predetermined time period of exclusive trading between a participant associated with the first incoming order and a participant associated with the first current order; and based on the act of determining that the second incoming order is contra to the second current order for the item, includes a volume equal to or greater than the volume of the second current order, and satisfies the adjusted predetermined minimum volume requirement, providing a predetermined time period of exclusive trading between a participant associated with the second incoming order and a participant associated with the second current order.

* * * * *